US006986123B2

(12) United States Patent
Finocchio

(10) Patent No.: US 6,986,123 B2
(45) Date of Patent: Jan. 10, 2006

(54) EXTENSIBLE ON-DEMAND PROPERTY SYSTEM

(75) Inventor: Mark J. Finocchio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 10/186,985

(22) Filed: Jun. 28, 2002

(65) Prior Publication Data

US 2004/0003138 A1 Jan. 1, 2004

(51) Int. Cl.
*G06F 9/44* (2006.01)

(52) U.S. Cl. ........................ 717/116; 717/117; 717/122

(58) Field of Classification Search ........ 717/100–123; 707/100–102

See application file for complete search history.

(56) References Cited

U.S. PATENT DOCUMENTS 6,499,062 B1 * 12/2002 Shteyn ....................... 719/315
6,675,228 B1 * 1/2004 Bahrs et al. ................ 719/318

OTHER PUBLICATIONS

Balwin, "JavaBeans, Properties, Constrained Properties", http://www.dickbaldwin.com/java/, pp.: 1-38, Feb. 98.*
Barker, P., "Towards Real Information on Demand", Online Information 96 Proceedings. 20th International Online Information Meeting, 1996, pp. 261-269.

* cited by examiner

*Primary Examiner*—Ted T. Vo
(74) *Attorney, Agent, or Firm*—Merchant & Gould; John J. Farrell

(57) ABSTRACT

A system and method for handling properties of objects is provided. More specifically, the system and method provide a dependency mechanism for expressing the relationship between the properties in a formal manner. This relationship may either be applied globally or locally. Using the dependency mechanism, the property system monitors relationships between properties and detects circularities between the different properties during runtime. The system and method also provide an evaluation mechanism for calculating a value for any of the properties. Because the property system is on-demand, the value need not be stored in local storage. The dependency mechanism and the evaluation mechanism are extensible, which allows the property system to model any type of relationship, such as a direct relationship, inheritance, reverse inheritance, property sheets, encapsulation, and the like.

14 Claims, 7 Drawing Sheets

EXTENSIBLE ON-DEMAND PROPERTY SYSTEM

BACKGROUND OF THE INVENTION

Today, most applications are written using objects. These objects may be supplied by third parties or may be developed specifically for an application. By using objects, code may be easily reused and incorporated into many different applications without modification. In addition, if modifications are necessary, a new object may be created that inherits the functionality of the object. Then, new specific functionality may be added to the new object as needed. This ability to reuse and modify existing objects reduces the development time for new applications, sometimes as much as from months to weeks.

However, even though the use of objects has become very commonplace and is beneficial, the current approach for handling properties in these objects has several drawbacks. For example, if a first property in an object is dependent on a second property in another object, a developer must write code that monitors (i.e., listens) to the second property and, upon change, change the first property. One simplified portion of code that performs these functions is as follows:

```
void Button1__OnPressedChanged(bool NewValue)
{    if (newValue == true)
     {    BackgroundColor = Color.Red;
     }
     else
     {    BackgroundColor = Color.Grey;
     }
).
```

As shown, this callback function returns a value for the second property (i.e., BackgroundColor), whenever the first property (e.g., Button1 Pressed) changes. Therefore, each time the first property state changes, a value (e.g., Red or Grey) is computed and stored in the second property during the callback. This technique requires storage in the object for the second property. The storage is used to keep a current state for the second property.

Because developers may develop these objects in isolation, circularities between some of the properties within different objects may occur. For example, continuing with the above example, a callback function for the backgroundColor property may be added that changes the state of the Button1 Pressed property. While having a callback function that changes the state of a button pressed property due to a change in backgroundColor is not very realistic and would not typically occur in an application, it helps illustrate the problem that occurs when two properties change each other's state. In actual applications, typically, two parameter would not change each other's state directly, but other dependent properties would cause the circularity illustrated by this simplistic example. Therefore, given the example above, at runtime, once one of these two properties changes state, both will continue to change states indefinitely. This circularity problem must then be identified and corrected before proper operation can occur. Unfortunately, it is very difficult to test every combination of property changes. Therefore, some of these circularity problems may not surface until after a software product has been released.

Due to at least these limitations, the current model for handling properties of objects is not ideal.

SUMMARY OF THE INVENTION

The present invention is directed at a system and method for handling properties of objects such that a change in a first property does not affect a dependent property until an operation associated with the dependent property is called. Thus, providing an on-demand type of property system. More specifically, the system and method provide a dependency mechanism for expressing the relationship between the properties in a formal manner. This relationship may either be applied globally or locally. Using the dependency mechanism, the property system can monitor relationships between properties and can detect circularities between the different properties during runtime. The system and method also provide an evaluation mechanism for calculating a value for any of the registered properties. Both the dependency mechanism and the evaluation mechanism are extensible, which allows the property system to model any type of relationship, such as a direct relationship, inheritance, reverse inheritance, property sheets, encapsulation, and the like.

One advantage of the present invention is that values do not need to be stored in local storage. In addition, because the property system is on-demand, the property system of the present invention is more scalable with respect to speed and memory performance.

Another advantage of the present invention is that the developers no longer need to write elaborate listener and callback functions to properly handle properties being developed.

Yet another advantage of the present invention is that managing storage for the properties in the objects becomes more efficient and convenient. Each object instance no longer needs to have local storage for each property in that object.

Yet still another advantage of the present invention is that the property system will detect circularity between properties during runtime and will break the circularity.

DETAILED DESCRIPTION OF THE PREFERRED EMBODIMENT

Briefly stated, the present invention provides an on-demand property system. This on-demand property system handles properties of objects in a manner such that a change in a first property does not affect a dependent property until an operation, associated with the dependent property, is called. More specifically, the system and method provide a dependency mechanism for expressing the relationship between the properties in a formal manner. This relationship may either be applied globally or locally. Using the dependency mechanism, the property system can monitor relationships between properties and can detect circularities between the different properties during runtime. The system and method also provides an evaluation mechanism for computing a value for any of the properties. Because the property system is on-demand, the value need not be stored in local storage. The dependency mechanism and the evaluation mechanism are extensible, which allows the property system to model any type of relationship, such as a direct relationship, inheritance, reverse inheritance, property sheets, encapsulation, and the like. These and other aspects of the present invention will become apparent after reading the following detailed description.

Figure 1:
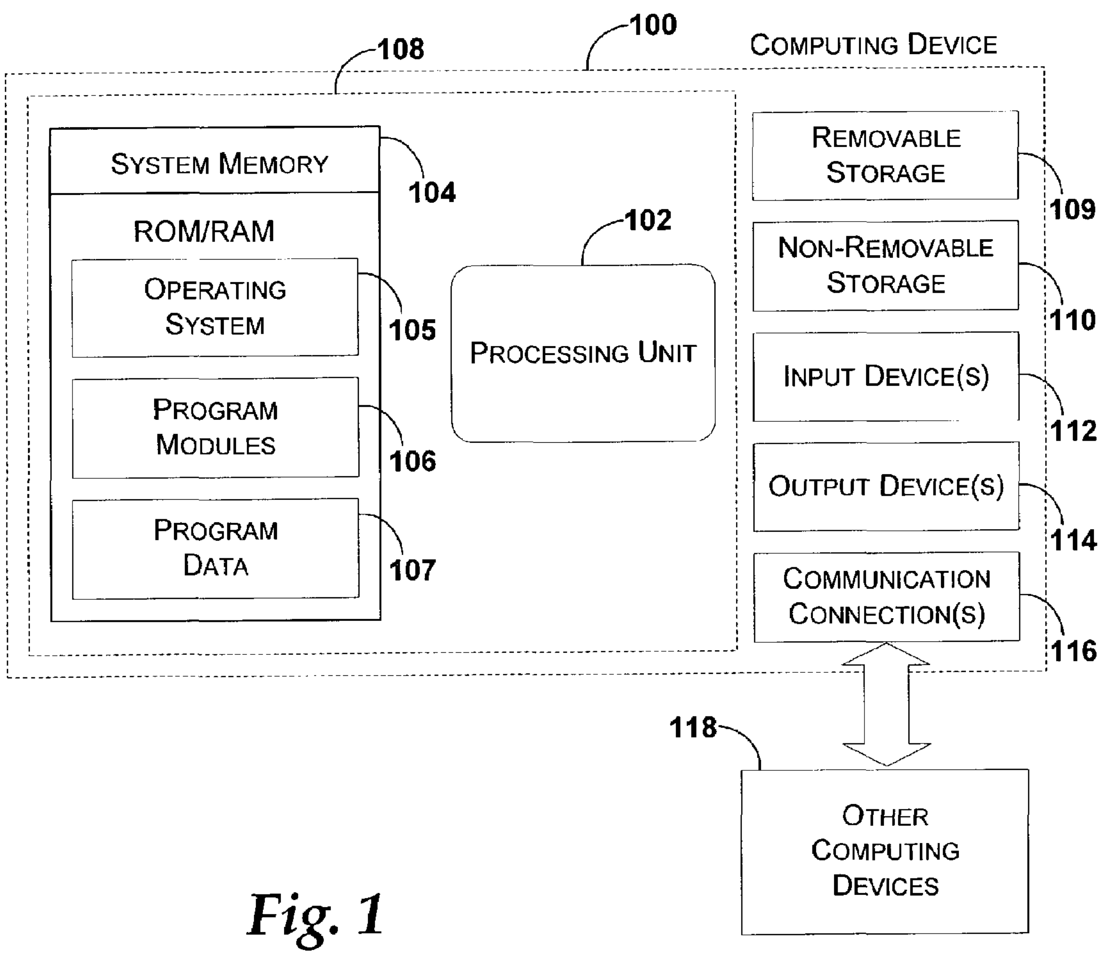
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include Visual Studio IntelliSense from Microsoft Corporation of Redmond, Wash., and other software programming environments, which utilize object libraries. In addition, program modules 106 include software applications created using a software-programming environment. When these software applications execute on processing unit 102, a property engine processes the software application in accordance with the present invention. The property engine may be part of operating system 105 or may be another program module 106. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
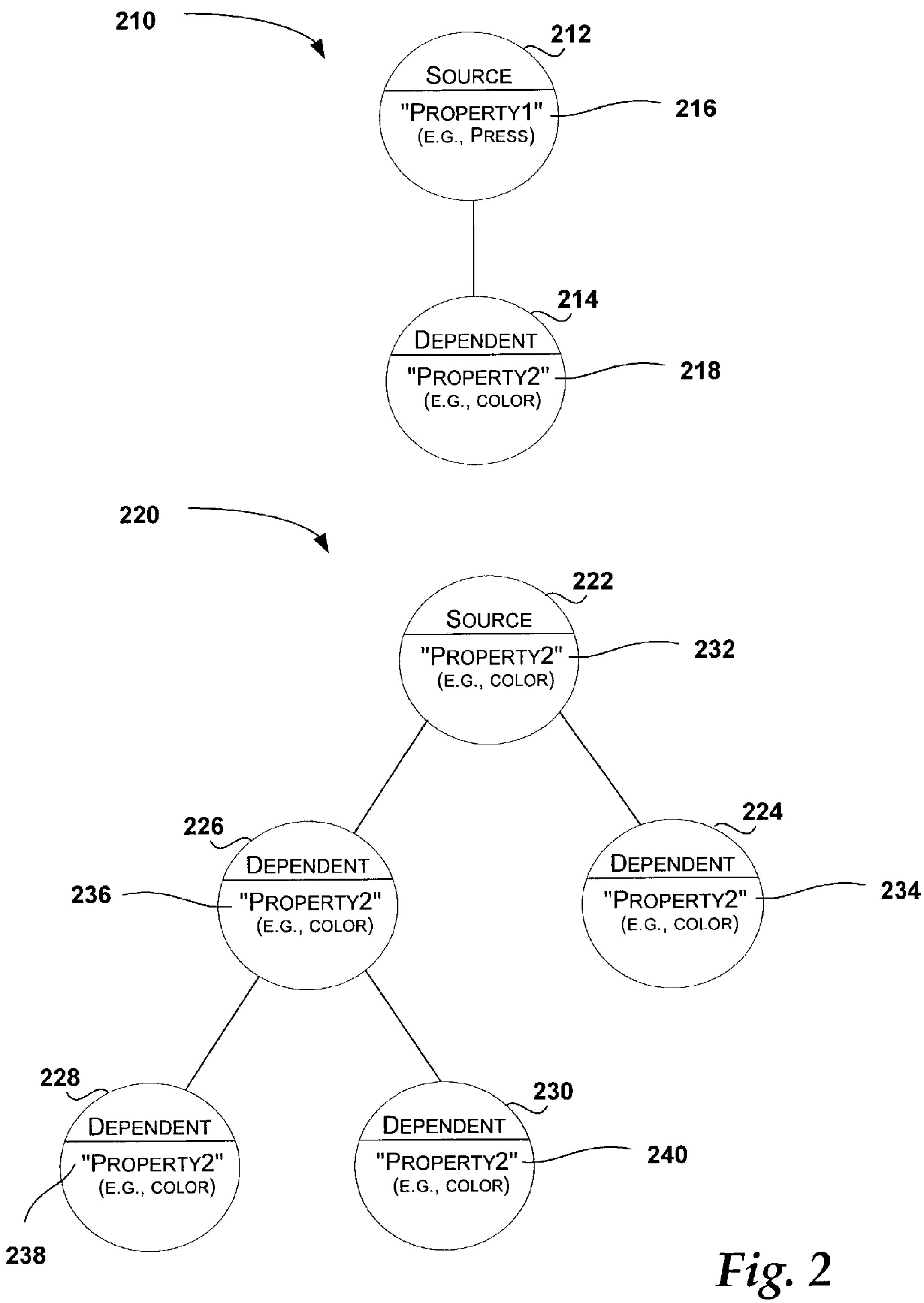
FIG. 2 is a graphical representation of property relationships that can be modeled by a property system in accordance with the present invention.

FIG. 2 is a graphical representation of property relationships that will be used in describing one illustrative implementation of the property system in accordance with the present invention. The property relationships include a direct relationship 210 and an inheritance relationship 220. In overview, a property change in the direct relationship 210 will ultimately affect properties within the inheritance relationship 220. While the property relationships modeled in FIG. 2 represent direct relationships and inheritance relationships between properties, those skilled in the art will appreciate that the property system of the present invention may be used to model other relationships, such as reverse inheritance, data binding, encapsulation, property sheets, and the like. Therefore, the relationships modeled in FIG. 2 are shown as non-limiting examples of the capabilities of the present invention.

Direct relationship 210 includes two nodes 212 and 214. For the purposes of the following discussion, a node refers to an object that exposes two common interfaces to the property engine for operating on a property. Briefly, described in detail later in conjunction with FIG. 4, the two common interfaces include a query function and a set function. Node 212 includes a Property1 216, such as a Pressed property on a button. Node 214 includes a Property2 218, such as a Color property for a background of a button. As explained earlier, conventional property systems implement a listener function that would monitor Property1 216, and when Property1 216 changes, the conventional property systems update Property2 218, accordingly.

However, in contrast, the property system of the present invention models the relationship between Property1 216 and Property2 218. For this relationship, node 212 is designated as a source for node 214. Node 214 is designated as a dependent. In general, a source represents a node that affects another node. A dependent represents a node that is affected by another node. In the above-illustrated example, any object within an application may use one of the common interfaces for operating on Property2 218. Briefly, a getValue( ) method and a setValue( ) method, described in detail later in conjunction with FIGS. 5 and 6, respectively, insure that a common interface is provided by all nodes. This common interface allows the property engine and any object the ability to access a desired property using the common interface. For example, the query (i.e., getValue) will ultimately obtain a relevant value from one of its sources. In the direct relationship 210 illustrated in FIG. 2, this source is node 212. Thus, the desired operation is performed on-demand without needing local storage for Property2 218 within node 214.

Inheritance relationship 220 includes a plurality of nodes 222–230. The nodes are structured in a conventional hierarchical manner for inheriting, with the exception that the properties in leaf nodes (e.g., nodes 224–230) do not necessarily have local storage for their inherited property, inherited Property2 234–240, respectively. Rather, in accordance with the present invention, the two common interfaces for querying and setting a value for these properties 234–240 are used to operate on the properties on demand.

One will note that node 214 in the direct relationship 210 and node 222 in the inheritance relationship 220 are actually the same node. This node was illustrated separately just for convenience in describing two types of relationships that the present invention can model. However, because node 214 and node 222 are actually the same, any object within an application may use one of the common interfaces for operating on a child property (e.g., Property2 240), such as querying for a value. This query will ultimately obtain a value from one of the nodes. The node from which the value is obtained may be a direct source or may be an indirect source that was derived indirectly from the direct source (i.e., node 226) of node 230. One skilled in the art will appreciate that even though some nodes (e.g., node 226) are label as a dependent in relation to node 222, the same node may be a source in relation to another node. For example, node 226 is a source for dependent node 230. All these dependency relationships are individually modeled.

One skilled in the art will appreciate that one node may have several sources and may itself be a source for multiple nodes. Each of these relationships is modeled in accordance with the present invention. However, once the relationships have been modeled, if changes are made to one of the sources, such as adding another source to that source, the original node does not need to be modified. Instead, in accordance with the present invention, the original node is almost unaware of these changes and the property engine performs the necessary underlying mechanism to affect the change. This provides a great advantage to developers.

Having described in overview fashion the operation of the property system when modeling a direct relationship and an inheritance relationship, the underlying mechanisms will now be described. In general, the property system provides a dependency mechanism (e.g., a reportDependent method) for describing these relationships between properties so that the property engine can be aware of changes to one property that will affect other properties. In addition, the property system provides an evaluation mechanism (e.g., an evaluate method) for evaluating the property that is being operated upon. In one embodiment of the present invention, both of these mechanisms are provided through a class (e.g., an Expression class).

Figure 3:
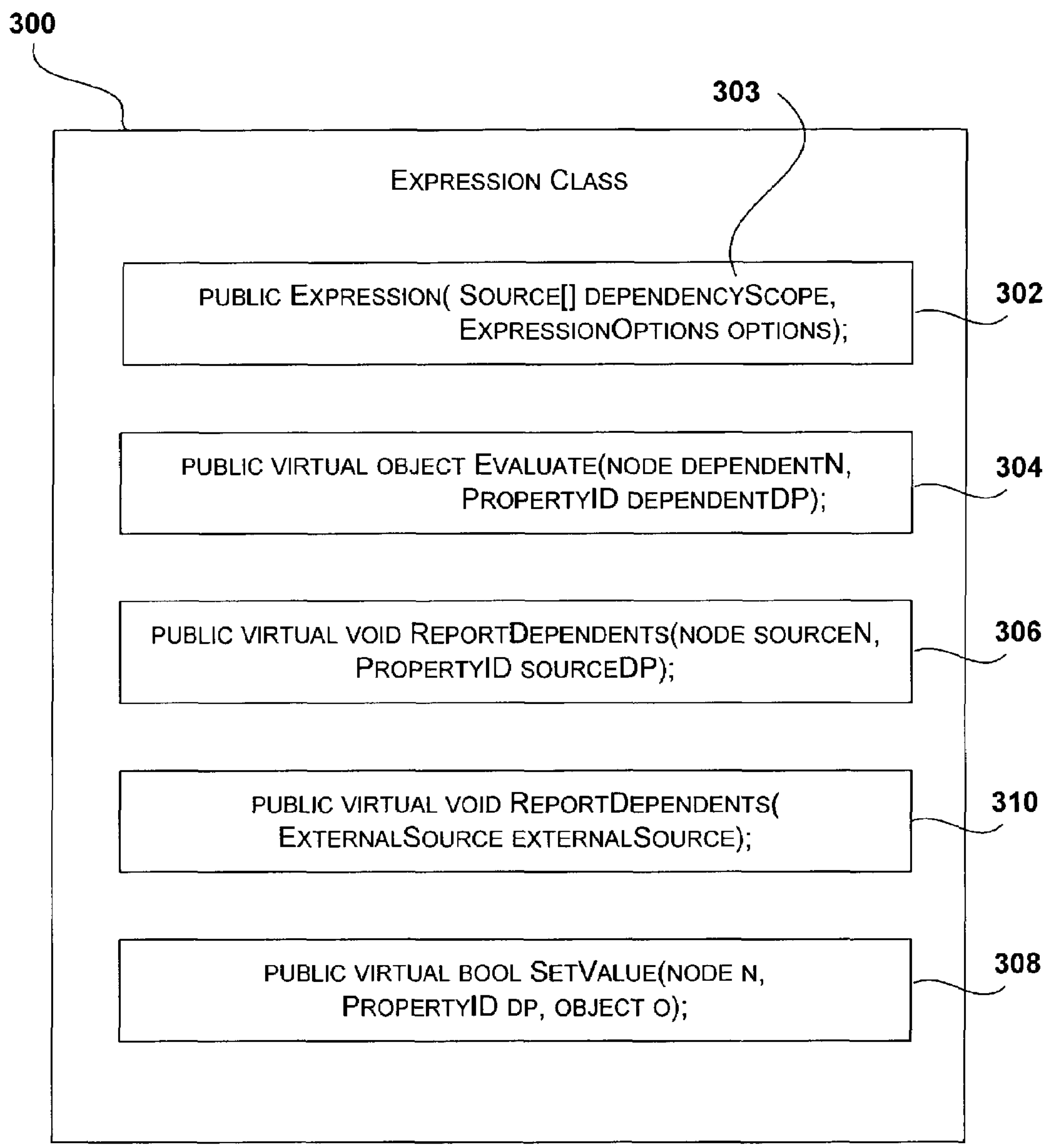
FIG. 3 illustrates an exemplary syntax for an Expression class that provides a dependency mechanism and an evaluation mechanism in accordance with one embodiment of the present invention.

FIG. 3 is a graphical representation of an exemplary Expression class. The Expression class includes a constructor 302, an evaluate method 304, a reportDependent method 306, and a setValue method 308. In addition, the Expression class may include an external reportDependent method 310 for when a source is external, such as a database field. The constructor 302 takes a source parameter 303 for specifying the sources for the dependent property for which the constructor 302 is creating an expression object. This expression class 400 thus provides the dependency mechanism through the reportDependent method 306 and provides the evaluation mechanism through the Evaluate method 304. A developer will override the reportDependent method 306 and Evaluate method 304 for each parameter that is registered. One will note that the evaluate method 304, the reportDependent method 306, and the setValue method 308 each have at least two parameters, one designates a node and the other one designates a property via the propertyID.

Continuing with the inheritance relationship in FIG. 2, one exemplary Evaluate method 304 may be as follows:

```
Object Evaluate (Node dependentNode, ID dependentID)
{
    // Return parent's value
    return (dependentNode.Parent.getValue(dependentID));
}.
```

This overridden Evaluate method 304 thus attempts to return a value from the parent of the object that was passed in as a parameter. The node and propertyID associated with the dependent that is being evaluated are passed in as parameters. The value is then computed from its sources. In the above inheritance example, its sources include the parent. However, because the parent is also modeled and has an overridden evaluate method, the evaluation process may proceed up the tree to other sources until finally a value is returned. In FIG. 2, this will occur when a getValue is performed on node 212. One skilled in the art will appreciate that a developer is responsible for determining the search path for obtaining a value. For example, in the above inheritance example, the evaluation method associated with node 222 may have provided a default value. Therefore, one will appreciate that the expression class allows the evaluate mechanism to be quite extensible in determining where to obtain a value and in which sequence to search.

The reportDependent method 306 is also overridden by the developer in order to designate to the property system the formal dependency relationships. Briefly, described in detail in conjunction with flow diagrams in FIGS. 6 and 7, the reportDependent method 306 is responsible for invalidating each dependent that has a source that changed. If one of the dependents is a source, then the reportDependent method for that source is invoked to invalidate its dependents. Thus, the reportDependent process continues recursively until all the relationships affected by the change have been invalidated. In one embodiment, the dependents are marked invalid by an interface provided by the property engine (e.g., Node-.MarkDependent(PropertyID)). The following in an exemplary overridden reportDependent method 306 for the inheritance relationship described in FIG. 2:

```
void reportDependents(Node sourceNode, ID sourceID)
{    if(sourceID == Property1)
     {    foreach (Node child in ChildrenCollection)
          {child.markDependent (Property1)
          }
     }
     else if(sourceID == Parent)
     {    foreach (Node child in ChildrenCollection)
          {    foreach (ID id in RegisteredPropertiesCollection)
               {    child.markDependent(ID);
               }
          }
     }
}
```

Thus, in this exemplary overridden reportDependent method 306, the Property2 on every child is invalidated. In addition, if a node's parent property changes, then every inherited property on every child must be marked as invalid.

In a further refinement of the invention, in one embodiment, a special invalidate method is provided that invalidates several properties at once.

As mentioned above, in order for the property system to provide this formal dependency, specific common APIs are made available at each node. These common APIs allow the property engine and any object the ability to access a desired property using the common interface (e.g., API).

Figure 4:
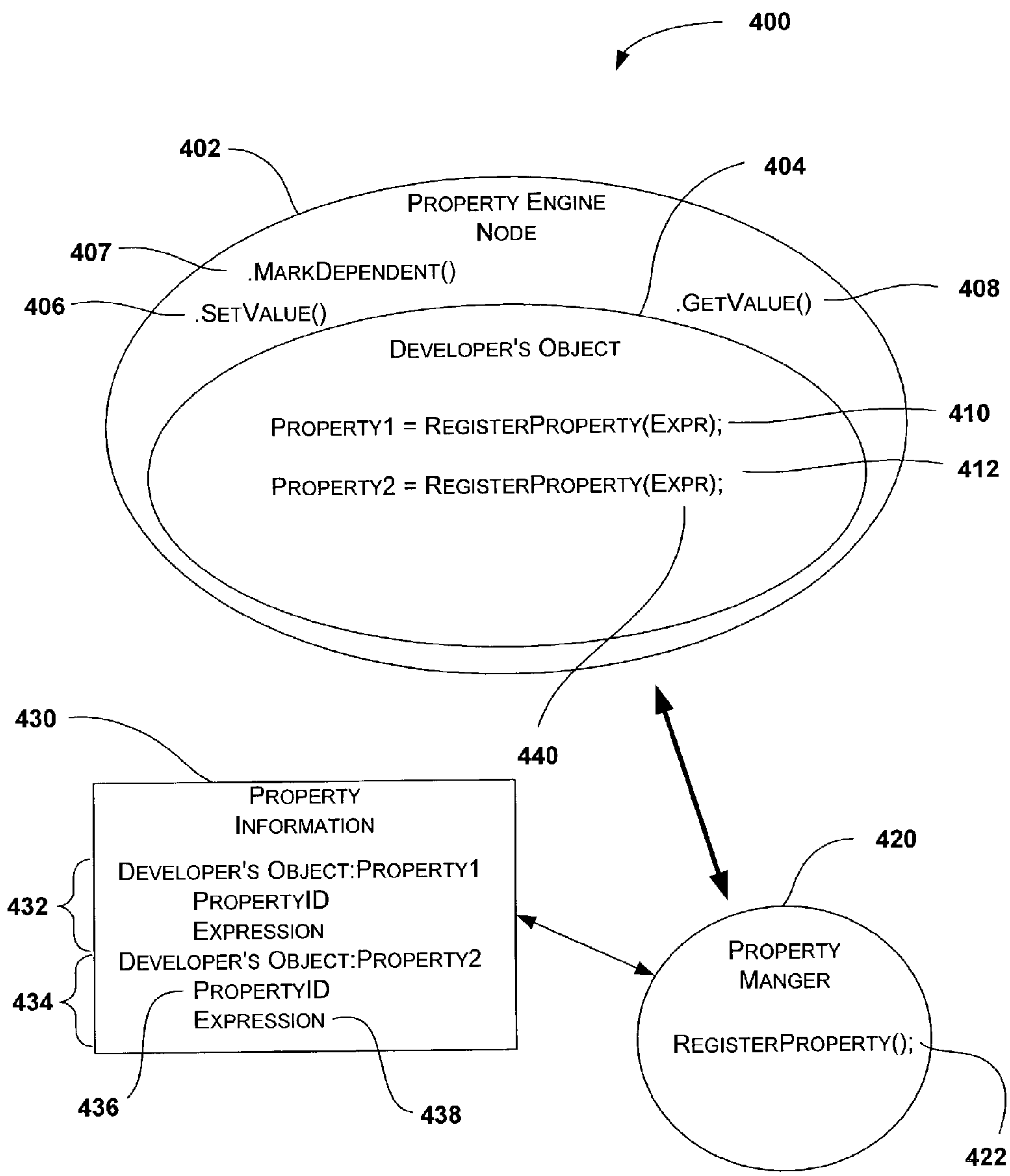
FIG. 4 is a graphical representation of a programming model that provides specific common interfaces to the nodes in accordance with the present invention.

FIG. 4 is a graphical representation of a programming model 400 that provides specific common interfaces to the nodes in accordance with the present invention. For the following discussion, the term object is used to refer to an instance of a class. Those skilled in the art will appreciate that for each object, there is a class from which the object is instantiated. Also, an object may have functionality derived from multiple classes. The programming model 400 provides a node class 402. The property engine knows about the node class 402. The node class 402 includes a setValue( ) method 406 and a getValue( ) method 408. The setValue( ) method 406 and the getValue( ) method 408 represent the common interfaces provided by each node. A developer object 404 inherits functionality provided by the node class 402 (i.e., setValue( ) method 406 and getValue( ) method 408). The developer object 404 may include one or more properties (e.g., Property1 and Property2). Within the developer object 404, instructions are written to register each of the one or more properties using a registerProperty call (e.g., registerProperty call 410 and 412).

The registerProperty method 422 is provided by a property manager 420 within the property engine. The property manager 420 manages the properties (e.g., Property1 and Property2) that are registered and pertinent information regarding the registered properties is stored in a property information store 430. The property information store 420 resides in memory within computer system 100 shown in FIG. 1. Alternatively, portions of property information store 420 may be cached, may be stored on a storage medium, and the like. The property information store 420 includes a property entry (e.g., property entry 432 and 434) for each property that is registered. In accordance with the present invention, the property entry 434 includes a property identifier field 436 and an expression field 438. In addition, the property entry 434 may include other fields related to the registered property, such as a name field, a type field, a default value field, and the like. The default value field stores a default value for the property. This default value is used if the expression can not compute a value from a source.

The property entry 434 stores a unique property identifier in the property identifier field 436 for each property that is registered. In one embodiment, the unique property identifier is generated by RegisterProperty( ). The expression field 438 stores a derived expression object associated with the unique property identifier. This derived expression object is obtained from an expression parameter 440 in the register property call (e.g., register property call 410 and 412). As described above, the derived expression object includes an overridden evaluates method and an overridden reportDependent( ) method. Thus, once each property is registered, the dependency mechanism and the evaluate mechanism are globally available through the derived expression object associated with the registered property. In another embodiment, the global expression may be overridden with a local expression. The local expression is provided by an expression that knows about local values. These local expressions use a readLocalValue provided by the property engine in the node class to retrieve a local value. Thus, the local expression allows values that are stored locally on the node to be retrieved.

One skilled in the art will appreciate that the node class 402 also provides additional methods that are used internally, such as readLocalValue( ) method (not shown) and a writeLocalValue( ) method (not shown). In one embodiment, the readLocalValue( ) method is used by the local expression as mentioned above. The local expression is indirectly called by getValue. The writeLocalValue( ) is used by the setValue( ) method 406. One skilled in the art will further appreciate that an expression may contain other expression in which the 'parent' expression calls the evaluate( ) method associated with a "child" expression. "Child" expressions are referred to as indirect sources on the parent expression.

Figure 5:
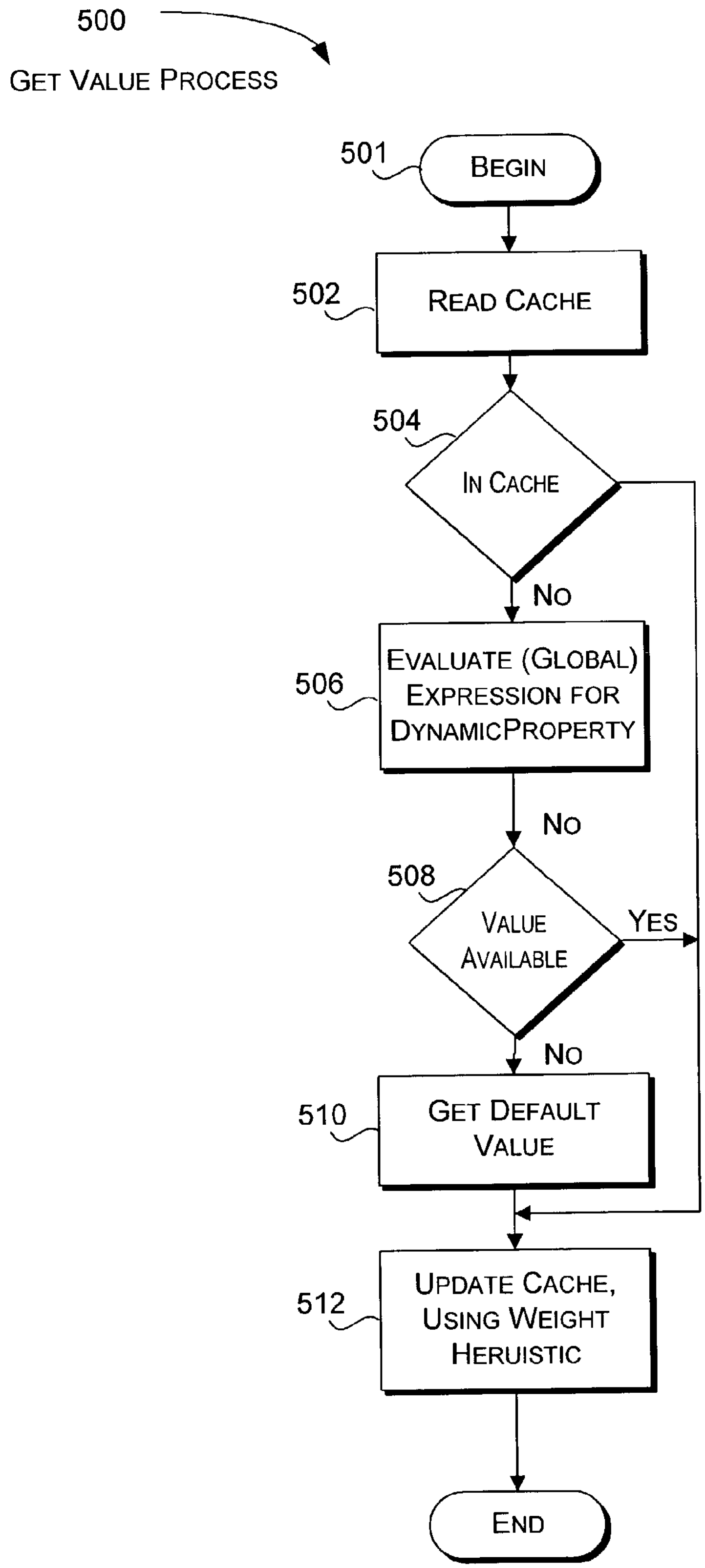
FIG. 5 is a logical flow diagram illustrating a get value process for retrieving a value for a registered property in accordance with the present invention.

FIG. 5 is a logical flow diagram illustrating an exemplary getValue process for retrieving a value for a registered property in accordance with the present invention. Processing begins at block 501, where the query has been initiated for a property (hereinafter referred to as the interested property). Processing continues at block 502.

At block 502, the process checks the cache to determine whether a value for the interested property has been previously cached. Typically, interested properties are cached in order to optimize retrieval. Processing continues to decision block 504.

At decision block 504, a determination is made whether the interested property has previously been cached. If the interested property has been previously cached, the process uses the cached value and continues at block 512. Alternatively, the process continues at block 506.

At block 506, the process evaluates an expression for the interested property. As described above, the expression may be a global expression that has been registered or a local expression that has overwritten the global expression for the current node. A local expression may overwrite the global expression as long as the global expression understands local values and evaluates an expression if an expression is stored locally. These expressions may involve searching various sources, such as property sheets, database fields, and the like. The developer may also prioritize the order in which source is searched by modifying the evaluation method, accordingly. Once one of the sources has a value, the expression stops evaluating. However, each source that is a dependent will also have its sources searched during the getValue process 500. Processing continues at decision block 508.

At decision block 508, a determination is made whether the expression process was successful in computing a value. If the expression process was successful, the value that was retrieved is returned and the process proceeds to block 512. Alternatively, if the expression process was not successful, processing continues at block 510.

At block 510, a default value is retrieved for the interested property. The default value is stored in the property information when the interested property is registered. The default value is passed as a parameter in the registerProperty call. Processing continues at block 512.

At block 512, the application may calculate a weight metric based on the stage of the expression at which the value was received, a number of hops that were taken in resolving the value, or the like. The weight metric is stored and is used to make educated decisions on which interested properties to cache in order to optimize future retrievals. The weight metric is based on the number of hops that were necessary when retrieving the value. A hop refers to each getValue( ) method that was called. Processing then ends.

Figure 6:
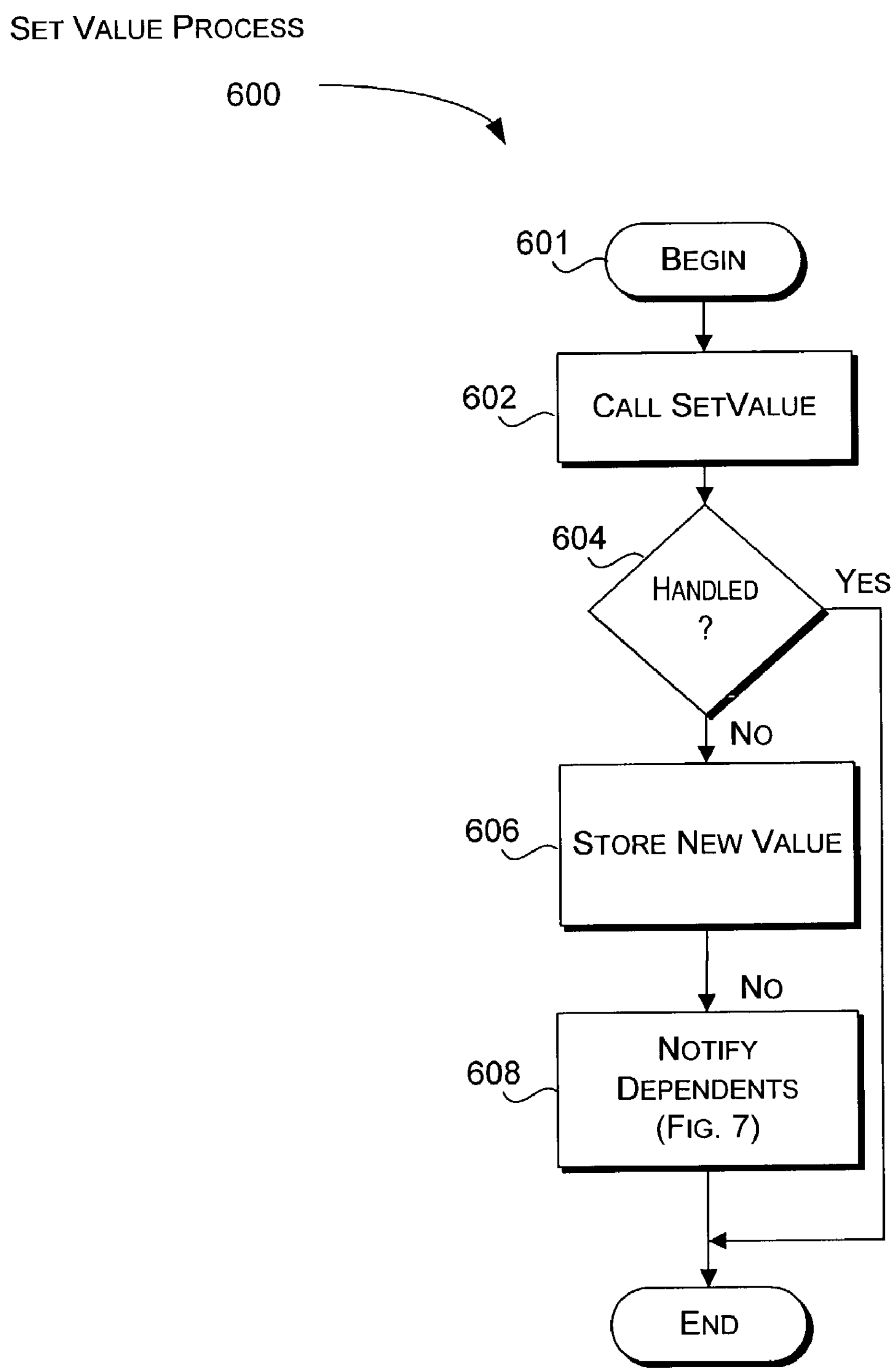
FIG. 6 is a logical flow diagram illustrating a set value process for setting a value for a registered property in accordance with the present invention.

FIG. 6 is a logical flow diagram illustrating a set value process for setting a value for a registered property in accordance with the present invention. The process begins at block 601, where an application is executing and a property has been registered. Processing continues at block 602.

At block 602, the application calls a setValue( ) for an interested property. As mentioned earlier, each object derives from the node class that provides the common interfaces (e.g., getValue( ) and setValue( )). Processing continues at decision block 604.

At decision block 604, a determination is made whether the expression handled the storing of the value itself. This allows the expression to store the value in another location rather than in local storage on the node. For example, if the expression is modeling databinding, the value that needs to be set resides externally in a database. Therefore, once the expression sets the value externally in the database, blocks 606 and 608 are circumvented and the expression tells setValue that the storing of the value was handled. Thus, if the expression handles the actual storing of the value, processing continues to the end. Otherwise, processing continues to block 606.

At block 606, the new value that was provided in the setValue( ) call as a parameter is stored locally on the object associated with the property identifier that was also passed as a parameter in the setValue( ) call. Because objects do not typically have storage for their properties locally within the object, dynamic storage may be allocated in order to store the new value. Processing continues to block 608.

At block 608, a notify dependents process is initiated. Briefly, described later in detail in conjunction with FIG. 7, the notify dependents uses the dependency mechanism to invalid each dependent for which the interested property was a source. As described above, this invalidation is recursive in nature until there are no more direct or indirect dependents that are affected by the change to the interested property. Processing is then complete.

Figure 7:
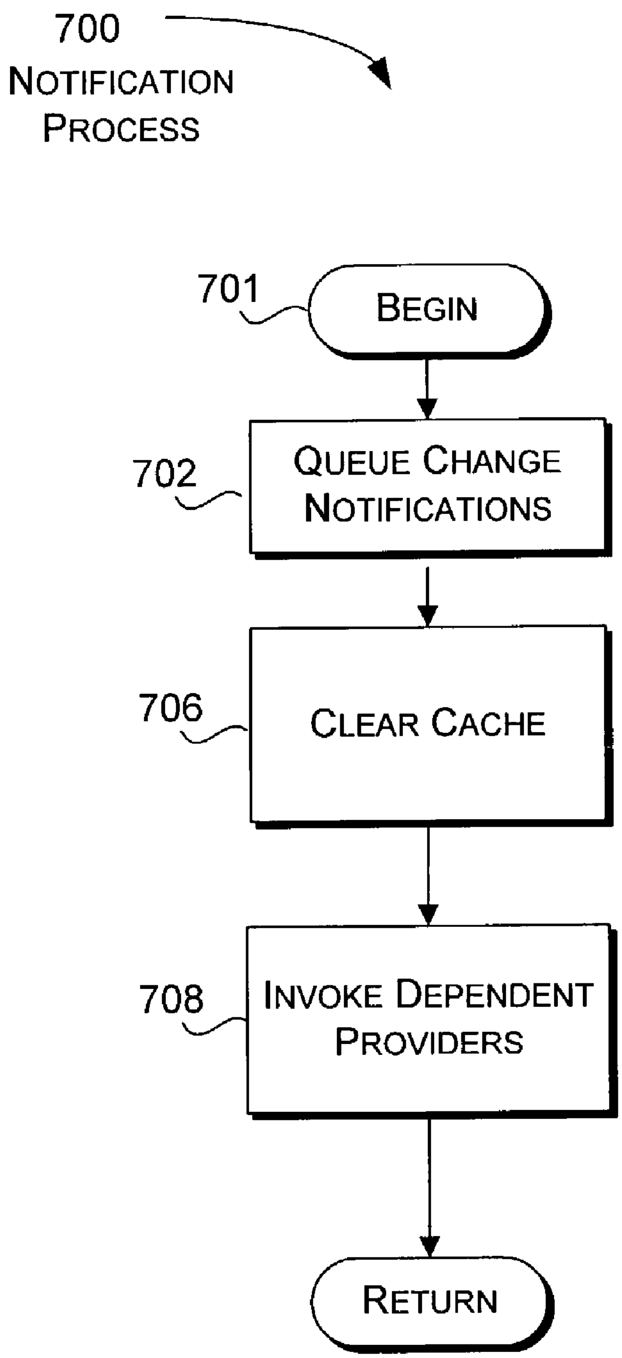
FIG. 7 is a logical flow diagram illustrating an exemplary reporting process suitable for use in the set value process in FIG. 6.

FIG. 7 is a logical flow diagram illustrating an exemplary reporting process suitable for use in the set value process in FIG. 6. Processing begins at block 701, where a value for a source has already changed. Processing continues at block 702.

At block 702, change notifications are queued. If change notifications are enabled for a particular property on a particular node, the current value is always cached. This represents the old value that is used in the change notification. Thus, before the cache is erased, the old value is stored in the change notification. Then, the new value is computed and re-cached. After that, the notification is ready to be fired. Processing continues at block 706.

At block 706, the cache is cleared with respect to the interested property. Those skilled in the art will appreciate that for certain interested properties, the cache maintained in the property engine may not contain a value for the interested property. Therefore, an expression will not inadvertently retrieve a wrong value for the interested property from the cache. Processing continues at block 708.

At block 708, the dependent providers are invoked. These dependent providers are expressions (i.e., reportDependents). Because the markDependent process may be "marking" a dependent that has other dependents of its own, the reportDependent method for each of these other dependents in invoked. When each of the reportDependent methods of these other dependents is invoked, a new markDependent process begins. Thus, each markDependent process is processing on a different dependent. During this process, the property engine maintains a list of properties which have been invalidated, if one of the properties appears twice, the property engine recognizes that the dependency relationships associated with this source are circular. Therefore, the property engine will break the circularity. This is another advantage over conventional property systems. Processing is then complete and proceeds to the return.

The above specification, examples and data provide a complete description of the manufacture and use of the composition of the invention. Since many embodiments of the invention can be made without departing from the spirit and scope of the invention, the invention resides in the claims hereinafter appended.

The following illustrates the extensible nature of the invention. The example (i.e., DBBindExpression), illustrates two-way binding in which a value for an external database field is set and retrieved.

```
// DBBindExpression (instance-based Expression)
internal class DBBindExpression : Expression
{
            public DBBindExpression(string pretendDBFieldID):
            base(Source.External( ), // Represents pretend DB field in
            property engine ExpressionOptions.AutoReport) // Auto-report attached dep on a source change
    {
        // Source.External( ) automatically creates an 'ExternalSource'
        object
        // which provides identity for pretendDBFieldID in the property
        engine.
        // The ExternalSource object created is accessed via GetSourceES(0)
        // (it's the first one in the list, hence the 0)
    }
// N[DP] = ExSrc(DBField)
            public override object Evaluate(Node n, PropertyID dp)
                {// Dependent DP must by of type 'string'
                    return pretendDBField;
            }
// Push SetValue calls through to DBField (which will invalidate the field)
            public override bool SetValue(Node n, PropertyID dp, object o)
            {
                    WriteDBField((string)o);
                    // SetValue handled by this Expression
                        return true;
            }
// Simulate direct write of DBField
            public void WriteDBField(string newFieldValue)
            {
                    // Write to pretend database
                    pretendDBField = newField Value;
                    // Invalidate external source
                    GetSourceES(0).InvalidateExternal( );
            }
private string pretendDBField; // Represents physical storage for 'pretendDBFieldID'
}
```

I claim:

1. A computer-implemented method for managing properties of objects, the method comprising:

associating an expression with a property of an object, the expression defining a relationship between the property and at least one source property;

in response to a request for a value of the property, evaluating the expression to determine the value of the property;

returning the value of the property;

invalidating the value of the property if the at least one source property has undergone a change; and reevaluating the expression to determine a new value of the property based on the change to the at least one source property in response to a subsequent request for the value of the property.

2. The computer-implemented method of claim 1, wherein the relationship defined by the expression corresponds to a relationship between a value of the at least one source property and the value of the property.

3. The computer-implemented method of claim 2, wherein evaluating the expression comprises determining the value of the at least one source property to compute the value of the property.

4. The computer-implemented method of claim 3, wherein the value of the at least one source property is defined by another expression.

5. The computer-implemented method of claim 1, wherein invalidating comprises clearing the value of the property from a cache.

6. The computer-implemented method of claim 1, further comprising invalidating other property values that are defined by other expressions and for which the property is a source in response to a change in the value of the property.

7. The computer-implemented method of claim 6, further comprising monitoring the at least one other property being invalidated to determine whether a circularity exists within the relationship.

8. A computer-implemented method for managing properties of objects, the method comprising:

associating an expression with a property of an object, the expression defining a relationship between the property and at least one source property;

in response to a request for a value of the property, evaluating the expression to determine the value of the property;

returning the value of the property;

invalidating other property values that are defined by other expressions and for which the property is a source in response to a change in the value of the property; and monitoring the at least one other property being invalidated to determine whether a circularity exists within the relationship.

9. The computer-implemented method of claim 8, wherein the relationship defined by the expression corresponds to a relationship between value of the at least one source property and the value of the property.

10. The computer-implemented method of claim 9, wherein evaluating the expression comprises determining the value of the at least one source property to compute the value of the property.

11. The computer-implemented method of claim 10, wherein the value of the at least one source property is defined by another expression.

12. The computer-implemented method of claim 8, further comprising invalidating the value of the property if the at least one source property has undergone a change.

13. The computer-implemented method of claim 12, further comprising reevaluating the expression to determine a new value of the property based on the change to the at least one source property in response to a subsequent request for the value of the property.

14. The computer-implemented method of claim 12, wherein invalidating the value of the property comprises clearing the value of the property from a cache.

* * * * *